US006757247B1

United States Patent
Zheng et al.

(10) Patent No.: US 6,757,247 B1
(45) Date of Patent: Jun. 29, 2004

(54) CIRCUIT AND METHOD FOR CONTROLLING VIRTUAL CONNECTIONS IN A RING NETWORK

(75) Inventors: Dan Zheng, Plano, TX (US); Sheila C. Field, Frisco, TX (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/026,729

(22) Filed: Feb. 20, 1998

(51) Int. Cl.[7] .............................. H04L 12/26; H04J 3/22

(52) U.S. Cl. ....................... 370/231; 370/403; 370/409; 370/468

(58) Field of Search ................................. 370/230, 232, 370/234, 233, 254, 253, 395, 397, 409, 403, 404, 405, 406, 431, 442, 443, 459, 460, 465, 468, 231, 395.2, 395.21

(56) References Cited

U.S. PATENT DOCUMENTS

| | | | |
|---|---|---|---|
| 4,677,611 A | | 6/1987 | Yanosy, Jr. et al. ........... 370/85 |
| 5,070,498 A | * | 12/1991 | Kakuma et al. .............. 370/60 |
| 5,280,475 A | * | 1/1994 | Yanagi et al. ................. 370/60 |
| 5,289,462 A | * | 2/1994 | Ahmadi et al. ............ 370/60.1 |
| 5,339,314 A | * | 8/1994 | Tanaka et al. .............. 370/230 |
| 5,347,511 A | * | 9/1994 | Gun ............................ 370/54 |
| 5,390,164 A | | 2/1995 | Kremer ..................... 370/16.1 |
| 5,394,389 A | | 2/1995 | Kremer ..................... 370/16.1 |
| 5,412,652 A | * | 5/1995 | Lu ........................... 370/85.12 |
| 5,457,687 A | * | 10/1995 | Newman ................... 370/85.3 |
| 5,490,138 A | * | 2/1996 | Niestegge et al. ............ 370/56 |
| 5,502,816 A | * | 3/1996 | Gawlick et al. ....... 395/200.15 |
| 5,515,363 A | * | 5/1996 | Ben-Nun et al. ............ 370/17 |
| 5,537,411 A | | 7/1996 | Plas .......................... 370/85.1 |
| 5,557,611 A | * | 9/1996 | Cappellari et al. ......... 370/60.1 |
| 5,583,849 A | | 12/1996 | Ziemann et al. ............ 370/397 |
| 5,612,959 A | | 3/1997 | Takase et al. ............... 370/390 |
| 5,636,215 A | | 6/1997 | Kubo et al. ................. 370/397 |
| 5,673,262 A | | 9/1997 | Shimizu ..................... 370/395 |

(List continued on next page.)

OTHER PUBLICATIONS

"ATM Service Access Multiplexer (SAM) Generic Requirements", *GR–2842–CORE*, Issue 2, (Nov. 1996).
"ATM Virtual Path Functionally in SONET Rings—Generic Criteria", *Bellcore Standard GR–2837–CORE*, Issue 3, (Oct. 1996).
Fritz, J., "Bulletproofing ATM: Part 1", *Byte, 22*, pp. 59–60, (Jun. 1, 1997).
May, K.P., et al., "A Fast Restoration System for ATM–ring–based LANS", *IEEE Communications Magazine, 33*, pp. 90–98, (Sep. 1995).
Takase, A., et al., "ATM Transport Node for Flexible and Robust Access Networks", *Proceedings of the Global Telecommunications Conference (GLOBECOM)*, vol. 3, Houston, TX, pp. 1481–1487, (Nov. 1993).

Primary Examiner—Alpus H. Hsu
Assistant Examiner—Toan D. Nguyen
(74) Attorney, Agent, or Firm—Fogg and Associates, LLC; David N. Fogg

(57) ABSTRACT

A method for controlling virtual connections between endpoints over a unidirectional ring network. The network includes a number of network elements coupled together to form segments of the ring network. The method receives a request to create a virtual connection between first and second endpoints on the ring network. The method identifies the segments of the ring network that would be affected by the addition of the connection between the first and second endpoints. Further, the method retrieves data that represents the currently allocated capacity for each affected segment. For each affected segment, the method determines whether adding the requested virtual connection would exceed the capacity for the segment. The method transmits signals over the ring to establish the virtual connection when adding the virtual connection does not exceed the capacity for any of the affected segments.

19 Claims, 3 Drawing Sheets

U.S. PATENT DOCUMENTS

| | | | |
|---|---|---|---|
| 5,684,800 A | 11/1997 | Dobbins et al. | 370/401 |
| 5,754,528 A | 5/1998 | Uchida | 370/222 |
| 5,774,662 A | 6/1998 | Sakagawa | 395/200.33 |
| 5,805,568 A * | 9/1998 | Shinbashi | 370/223 |
| 5,805,820 A | 9/1998 | Bellovin et al. | 395/200.55 |
| 5,812,525 A * | 9/1998 | Teraslinna | 370/229 |
| 5,838,663 A * | 11/1998 | Elwalid et al. | 370/233 |
| 5,852,606 A | 12/1998 | Prince et al. | 370/393 |
| 5,867,502 A * | 2/1999 | Chang | 370/477 |
| 5,892,912 A | 4/1999 | Suzuki et al. | 395/200.48 |
| 5,912,891 A | 6/1999 | Kanai | 370/395 |
| 5,933,607 A * | 8/1999 | Tate et al. | 395/200.7 |
| 5,978,356 A * | 11/1999 | Elwalid et al. | 370/230 |
| 6,069,894 A * | 5/2000 | Holender et al. | 370/397 |
| 6,108,338 A * | 8/2000 | Ramfelt et al. | 370/403 |
| 6,175,870 B1 * | 1/2001 | Gawlick et al. | 709/227 |
| 6,400,681 B1 * | 6/2002 | Bertin et al. | 370/218 |

\* cited by examiner

CIRCUIT AND METHOD FOR CONTROLLING VIRTUAL CONNECTIONS IN A RING NETWORK

TECHNICAL FIELD OF THE INVENTION

The present invention relates generally to the field of communications and, in particular, to a circuit and method for controlling virtual circuit connections in a ring network.

BACKGROUND OF THE INVENTION

The telecommunications industry traditionally has provided services to subscribers over narrowband circuits. These narrowband circuits provided acceptable performance when the bulk of the demand for telecommunications services was predominantly for voice traffic. In recent years, additional telecommunications services have been developed that can use much higher bandwidth, e.g., internet access, video conferencing, corporate intranets. These "broadband" services are increasingly in demand. Unfortunately, the existing telecommunications networks are not designed to provide quality broadband services.

As the demand for access to telecommunications services increased, the industry used time division multiplexing technology to aggregate a number of lower bandwidth circuits onto higher bandwidth circuits. By the middle 1980's, the SONET standard was well established as a time division multiplexing technology for fiber optic transport systems. However, as anyone who has attempted to download a large data file over the internet can attest, current broadband services do not operate well over the existing telecommunications infrastructure.

The telecommunications industry has been developing approaches that will allow better use of bandwidth in a broadband network. For example, Bellcore has provided standards for transmitting asynchronous transfer mode (ATM) packets over a SONET ring network. See, e.g., GR-2842 and GR-2837. These Bellcore standards are incorporated herein by reference. These standards allow for the transmission of data between endpoints in a ring network over virtual circuits. However, the standards do not provide for determining how to control the generation of connections in the ring network. Without adequate control of new connections, a system could experience significant problems with quality of services provided over the networks high demand periods.

For the reasons stated above, and for other reasons stated below which will become apparent to those skilled in the art upon reading and understanding the present specification, there is a need in the art for controlling the generation of virtual connections, e.g., ATM connections, in a ring network.

SUMMARY OF THE INVENTION

The above mentioned problems with broadband ring networks and other problems are addressed by the present invention and which will be understood by reading and studying the following specification. A method for controlling access to a broadband ring network is described which determines whether a virtual connection will be allowed based on the impact that the connection will have on each affected segment of the ring network.

In particular, an illustrative embodiment of the present invention includes a method for controlling virtual connections between endpoints over a unidirectional ring network. The network includes a number of network elements coupled together to form segments of the ring network. The method receives a request to create a virtual connection between first and second endpoints on the ring network. The method identifies the segments of the ring network that would be affected by the addition of the connection between the first and second endpoints. Further, the method retrieves data that represents the currently allocated capacity for each affected segment. For each affected segment, the method determines whether adding the requested virtual connection would exceed the capacity for the segment. The method transmits signals over the ring to establish the virtual connection when adding the virtual connection does not exceed the capacity for any of the affected segments. In one embodiment, the step of determining whether adding the requested virtual connection would exceed the capacity for the segment depends on the distribution of traffic from a traffic shaper. For segments that would transport data packets for the requested virtual connection, the method determines whether the segment has sufficient capacity for the bandwidth used by the connection and additional over-allocated bandwidth for a traffic shaper that provides the requested virtual connection to the ring network. For segments that would transport data packets from other virtual connections originating from the same traffic shaper but not the requested virtual connection, the method determines whether the segment has sufficient capacity for the additional over-allocated bandwidth. Finally, for segments that would transport data packets from the requested virtual connection but no other virtual connection of the traffic shaper, the method determines whether the segment has sufficient capacity for the requested connection and the over-allocated bandwidth for the traffic shaper.

In another embodiment, a method for allocating bandwidth for a virtual connection between endpoints over a number of network entities that form a ring is provided. The method includes receiving a request to create a virtual connection between first and second endpoints. The first endpoint is associated with a traffic shaper that provides data packets to the ring network in discrete bandwidth units. The method further includes identifying segments of the ring network that would be affected by the addition of the connection between the first and second endpoints. The method determines the over-allocated bandwidth for the traffic shaper with the addition of the requested virtual connection. Further, for each affected segment, the method determines whether sufficient bandwidth is available to accommodate the requested virtual connection and the over-allocated bandwidth. Finally, the method includes establishing the virtual circuit when it is determined that sufficient bandwidth is available on each affected segment.

In another embodiment, a method for determining the bandwidth used by a traffic shaper that controls access to a ring network for a number of endpoints of virtual connections is provided. The method includes determining a bandwidth requirement for each virtual connection that is related to the peak and sustained rates for delivery of data packets for the virtual connection. Further, the method sums the bandwidth requirement for each of the virtual connections. The method determines an integer value that represents the number of units of bandwidth deliverable by the traffic shaper that are required to at least accommodate the bandwidth requirement. The method multiplies the integer value by the bandwidth of a unit bandwidth to determine the delivering bandwidth of the traffic source. The method also stores the delivering bandwidth of the traffic shaper to be used in allocating bandwidth in a ring network.

In another embodiment, a communication network that transmits data over virtual connections between communication endpoints is provided. The network includes a number of network elements coupled together so as to form a ring with adjacent network elements communicating over ring segments. Each network element is operable to communicate data between the network and at least one endpoint. At least one network element includes a connection controller that determines whether adding a requested virtual connection would exceed the capacity for segments affected by the addition of the virtual connection.

In another embodiment, a circuit that determines whether to allow a virtual connection to be established over a ring of network elements wherein adjacent network elements are coupled together by ring segments is provided. The circuit includes a memory that stores instructions. Further, the circuit includes a processor that executes the instructions to determine, for each affected ring segment, whether adding the virtual connection would exceed the bandwidth capacity of a segment of the ring network.

DETAILED DESCRIPTION OF THE INVENTION

In the following detailed description of the preferred embodiments, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
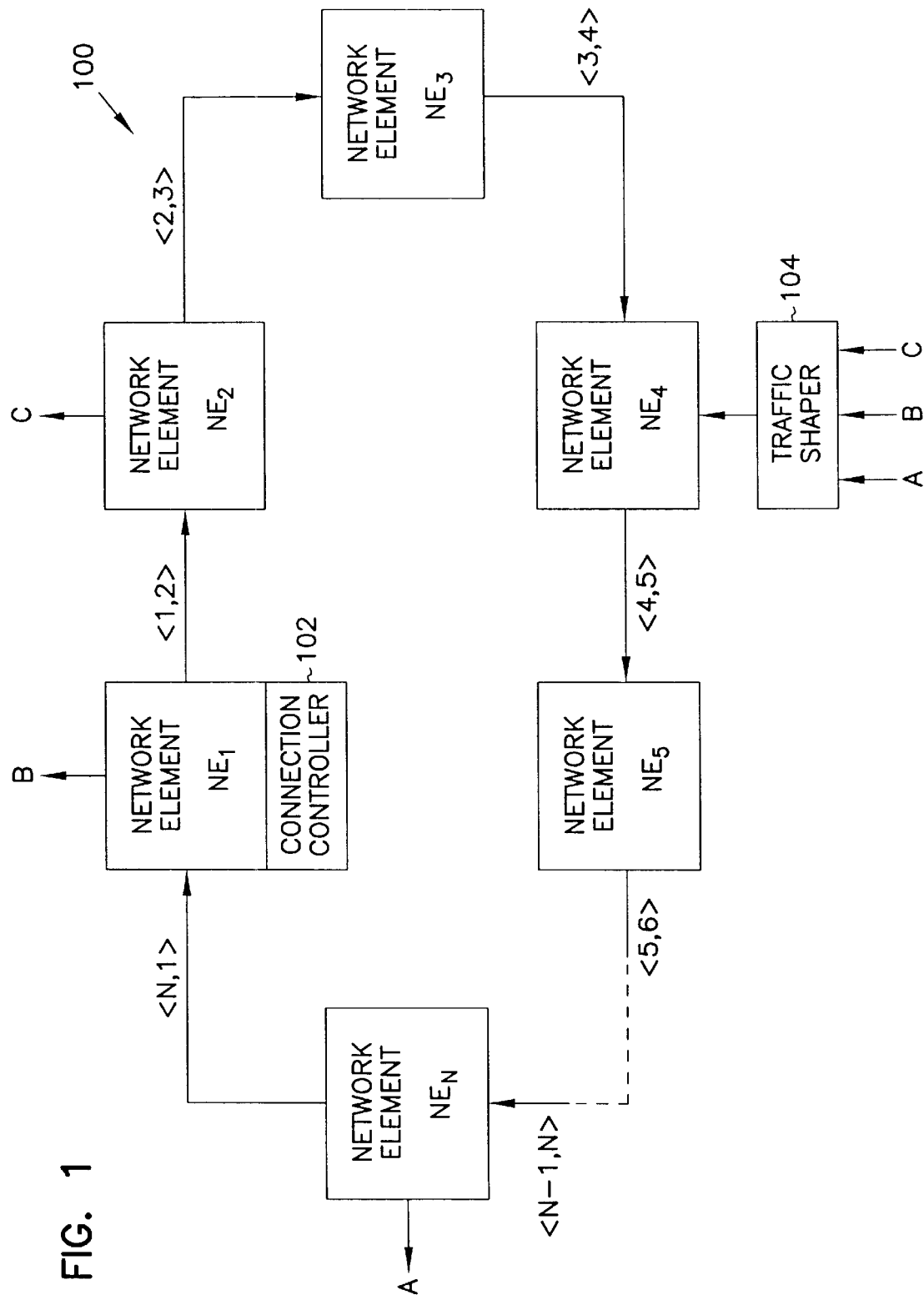
FIG. 1 is a block diagram of an illustrative embodiment of the present invention.

FIG. 1 is a block diagram of an illustrative embodiment of the present invention. Network 100 is a closed-loop, ring network that is formed by a unidirectional connection of network elements $NE_1$ through $NE_N$. Network 100 transmits data packets or cells between endpoints, e.g., terminals, associated with the network elements over virtual connections using, for example, asynchronous transfer mode (ATM), frame relay, or any other appropriate conventional virtual connection protocol. Network elements $NE_1$ through $NE_N$ may comprise, for example, virtual path add/drop multiplexers that operate on virtual connection packets.

Network 100 comprises a number of "ring segments." A ring segment is defined as a link that carries data packets or cells in a unidirectional path between two adjacent network elements. Each ring segment in FIG. 1 is denoted by the expression <first network element, second network element> wherein the first network element and the second network element are adjacent network elements in network 100 in the direction of traffic flow around the network. For example, the ring segment connecting network element $NE_1$ to network element $NE_2$ is denoted <1,2>.

Communication over network 100 is accomplished through virtual connections between "endpoints." Each virtual connection begins with a "traffic originating endpoint" and terminates at a "traffic terminating endpoint." The traffic originating endpoint adds traffic or data packets onto network 100 and the traffic terminating endpoint drops the traffic from network 100. There can be many traffic originating endpoints on each network element of ring network 100. Each traffic originating endpoint can be viewed as a single traffic source. Alternatively, a group of traffic originating endpoints can be viewed as one traffic source by multiplexing the traffic originating endpoints into a single virtual connection. In this case, the packets from each of the endpoints in the group terminates at endpoints on a common network entity. In other words, the virtual connections for each of the traffic originating endpoints in the traffic source span the same ring segments of network 100. It is also noted that each network entity supports multiple traffic terminating endpoints.

Typically, traffic on a virtual connection is "bursty." In other words, the rate at which packets are placed onto the virtual connection will vary over time. The bandwidth used to describe a traffic originating endpoint or source is typically a mean value of the required bandwidth of the endpoint. Two parameters are used conventionally to define the subscribed bandwidth for a virtual connection: a peak rate (PR), and a sustained rate (SR). The peak rate is the maximum bit rate at which data can be placed on network 100 by an associated traffic originating endpoint. The sustained rate is the average bit rate at which data is added to network 100 by the associated endpoint. When multiple endpoints are grouped into a traffic source, the allocated bandwidth for the traffic source can be less than the sum of the subscribed bandwidths of all of the endpoints in the associated group. This is represented mathematically in equation 1, wherein a group j can consist of endpoints labeled 1 through l.

$$B_j \le \sum_{i=1}^{l} PR_i \text{ and } B_j \le \sum_{i=1}^{l} SR_i \qquad (1)$$

This grouping of endpoints into a single traffic source with a bandwidth allocation that is less of the sum of the subscribed bandwidth of each of the endpoints is referred to as "statistical multiplexing" in virtual circuit applications.

Each group of endpoints can be controlled or throttled to only deliver data packets with a selected bandwidth onto network 100. In other words, data from a traffic source can be placed on to network 100 at an approximately constant rate even though the rate that the data is produced by the traffic source may vary over time. This is referred to as "traffic shaping" or "smoothing." This function is performed for connections A, B, and C in FIG. 1 by traffic shaper 104.

Controlling Connections in the Ring Network

Each virtual connection in network 100 is allocated a portion of the bandwidth on each segment of network 100 between the network entities where the virtual connection originates and terminates. For example, a portion of the bandwidth for each segment between network element $NE_4$ (originating) and network element $NE_2$ (terminating) is allocated for connection C. Since the ring segments of network 100 have a finite bandwidth, connection controller 102 is provided to determine whether there is enough bandwidth on each segment of network 100 that is affected by a request for a virtual connection to be established. If a connection is established when there is insufficient bandwidth on one or more segments, packets could be lost and thus service over network 100 would degrade.

Connection controller 102 is programmed, e.g., using hardware, software, firmware or a combination thereof, to implement functions that determine when a connection can be allowed in network 100 without exceeding the bandwidth capacity for the ring segments of network 100. For example, connection controller 102 is programmed to implement the functions described in more detail below. In one implementation, the connection controller is included on the network management interface card (NMIC) of the gateway node of network 100. However, the location of the connection controller in network 100 is not critical.

Essentially, connection controller 102 assures that the sum of all the bandwidth required for each connection that passes over a segment is less than or equal to the total bandwidth available on the physical line connecting adjacent network elements of that segment. Connection controller 102 only allows connections to be established if sufficient bandwidth is available on all affected segments. Thus, connection controller 102 is advantageously included to guarantee that the quality of service over network 100 will not degrade by allowing too many connections.

Over-Allocated Bandwidth

In some circumstances, connection controller 102 also considers "over-allocated" bandwidth in assessing whether to allow a connection to be established. Over-allocated bandwidth is bandwidth that is allocated to a virtual connection that exceeds the required or subscribed bandwidth for service on the virtual connection. The over-allocated bandwidth assures quality of performance in the network. Traffic shapers, or other equipment used to control virtual connections, can produce over-allocated bandwidth. A traffic shaper produces over-allocated bandwidth because it delivers data to a network in integral multiples of a unit bandwidth. For example, a traffic shaper may only be able to deliver data to a ring network in multiples of 4 Megabits per second up to the line rate of the network. When the subscribed bandwidth is less than an integral multiple of a unit bandwidth, excess bandwidth is assigned to the virtual connection. This is referred to as "over-allocated" bandwidth.

The source of over-allocated bandwidth for traffic shaper 104 is illustrated with reference to equations 2 through 4 below. Traffic shaper 104 delivers data with a bandwidth defined by equation 2.

$$DB = \sum_j B_j \quad (2)$$

In equation 2, the delivered bandwidth, DB, of traffic shaper 104 is equal to the sum of the bandwidth, B, of each traffic source, j, that is associated with traffic shaper 104.

Traffic shaper 104 delivers data to network 100 in integral multiples of a bandwidth, e.g., 4Megabits per second, referred to as a "unit bandwidth" or the "granularity" of the traffic shaper. For purposes of this specification, the granularity of a traffic shaper is designated G in the remaining equations. With the granularity limitation, deliverable bandwidth for traffic shaper 104 is modified as shown in equation 3:

$$DB = \left\lceil \frac{\sum_j B_j}{G} \right\rceil \times G \quad (3)$$

In equation 3, the brackets around the first expression refer to the "ceiling function." This means that the result of the division inside the brackets is rounded up to the next highest integer value. For example, traffic shaper 104 receives inputs from three traffic sources with data rates of 3, 7, and 9 megabits per second, respectively. Thus the summation portion of equation 4 results in a total of 19 megabits per second. Assuming that the granularity with which traffic shaper 104 delivers data packets to ring network 100 is 4 Megabits per second, the result of the division operation of equation 3 is 4.75. The ceiling function raises this value to 5. Thus equation 3 produces a value of 20 Megabits per second for the deliverable bandwidth for traffic shaper 104.

The deliverable bandwidth of a traffic shaper will often exceed the bandwidth subscribed for by its associated virtual connections. The amount by which the deliverable bandwidth exceeds the subscribed bandwidth is the "over-allocated bandwidth." The amount of over-allocated bandwidth for traffic shaper 104 is defined by equation 4.

$$OAB = \left( \left\lceil \frac{\sum_j B_j}{G} \right\rceil - \frac{\sum_j B_j}{G} \right) \times G \quad (4)$$

This over allocated bandwidth is not wasted bandwidth. It may be used at different times by different traffic sources associated with traffic shaper 104 when a traffic source meets or exceeds its peak rate. Thus this over allocated bandwidth is essentially a shared bandwidth that prevents connection controller 102 from granting requests for bandwidth that would exceed the capacity of any segment of network 100.

It is noted that traffic sources associated with a single traffic shaper may be terminated at different network entities in network 100. Thus, it is possible that the virtual connection of a traffic shaper that terminates at the furthest network entity in network 100 from the originating network entity could use the over allocated bandwidth, e.g., connection C in FIG. 1. Thus connection controller 102 carries the over allocated bandwidth for traffic shaper 104 through each affected segment of network 100. For example, as shown in FIG. 1, traffic shaper 104 includes three traffic sources identified as traffic sources A, B and C. Connection controller 102 of network 100 allocates bandwidth to the various affected ring segments as shown in Table 1. In this example, connections A, B, and C are 3, 7, and 9 Megabits per second, respectively, and the "granularity" of traffic shaper 104 is 4 Megabits per second. All bandwidth indications in Table 1 are in Megabits per second.

TABLE 1

| Segment | Allocated bandwidth | Over-allocated Bandwidth |
|---|---|---|
| <4,5> | 19 | 1 |
| <5,6> | 19 | 1 |
| <N-1,N> | 19 | 1 |
| <N,1> | 16 | 1 |
| <1,2> | 11 | 1 |
| <2,3> | 0 | 0 |
| <3,4> | 0 | 0 |

As Table 1 indicates, traffic source 104 uses 19 Megabits per second of bandwidth. Since the granularity of traffic shaper is 4 Megabits per second, 1 Megabit per second will be over-allocated at this time. This over-allocation is carried through to network element $NE_2$ since this is where the last virtual connection terminates. It is noted that Table 1 only indicates the allocated and over-allocated bandwidth for virtual connections from traffic shaper 104. Network 100 could transport additional virtual connections.

Adding a New Traffic Source

Figure 2:
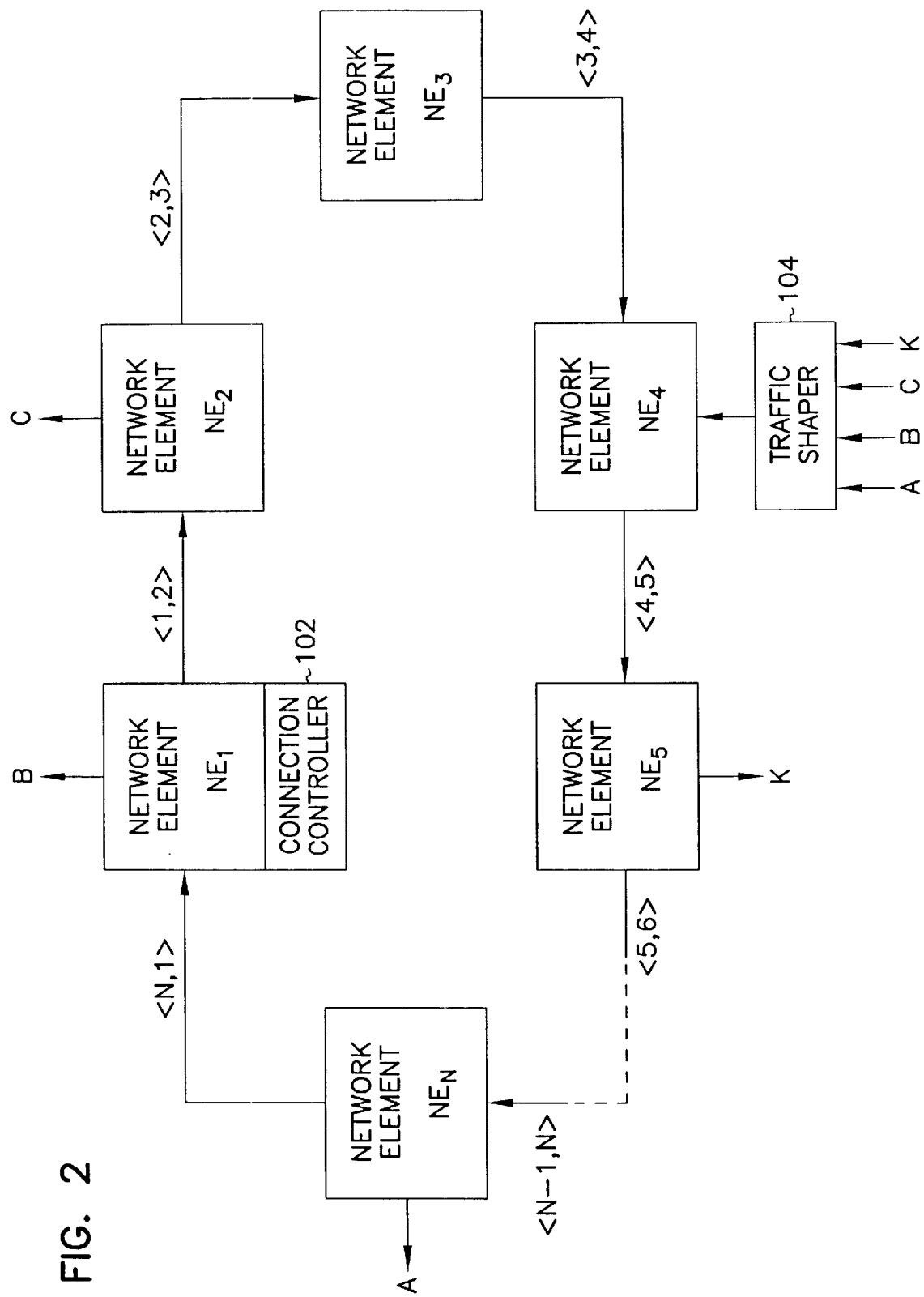
FIGS. 2 and 3 are block diagrams that illustrate an embodiment of a method for controlling connections to a ring network according to the teachings of the present invention.
Figure 3:
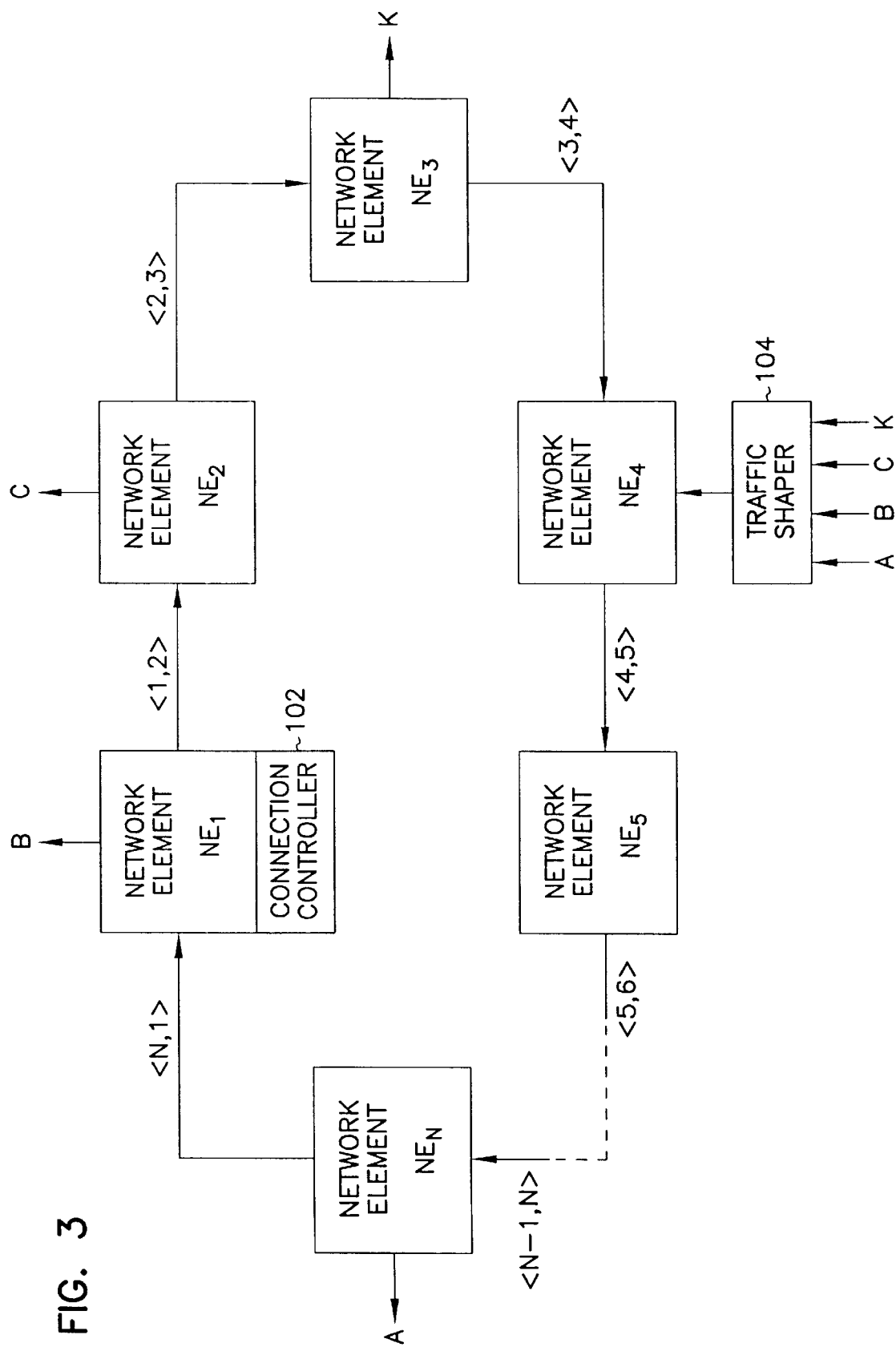

FIGS. 2 and 3 are block diagrams that illustrate techniques for determining whether to allow an additional traffic source, K, to be added to traffic shaper 104 and ring network 100 according to the teachings of the present invention. Essentially, connection controller 102 of network 100 looks at the effect that traffic source K will have on each segment that is associated with any traffic source for traffic shaper 104. First, the subscribed bandwidth, $B_k$, required by connection K is considered for some of the segments in network 100. Additionally, any change in the over-allocated bandwidth for traffic shaper 104 by the addition of traffic source K is also considered for some of the segments of network 100. The following equations provide the basis for this analysis by connection controller 102.

Two separate cases are illustrated by FIGS. 2 and 3, respectively. First, in FIG. 2, connection K is added to traffic shaper 104 and terminates at a network element that is not the last network element associated with a virtual connection for traffic shaper 104. FIG. 3 represents a case in which the new connection K terminates at a network entity that becomes the furthest network entity from traffic shaper 104. These two cases are described in turn.

In order to determine if the connection can be established, connection controller 102 determines the change in the over-allocated bandwidth by adding connection K. To do this, the new over-allocated bandwidth (NewOAB) is calculated according to equation 5.

$$NewOAB = \left( \left[ \frac{\sum_j B_j}{G} \right] - \frac{\sum_j B_j}{G} \right) \times G \quad (5)$$

In equation 5, j refers to the connections A, B, C, and K, $B_j$ represents the bandwidth of each connection, and G is the granularity of traffic shaper 104. It is noted that the over-allocated bandwidth may in fact decrease with the addition of connection K.

In this case of FIG. 2, each ring segment must satisfy the requirements of either equation 6 or equation 7 below in order for the connection K to be made. Equation 6 relates to the ring segments that are located between network element $NE_4$, the originating network element that is associated with traffic source 104, and network element $NE_5$, the network element at which connection K terminates. In this case, both the bandwidth for connection K and the change in over-allocated bandwidth must be considered to determine whether the line rate for the ring segment would be exceeded by addition of the new connection.

$$AR \geq CB + B_k + NewOAB - OldOAB \quad (6)$$

In equation 6, the expression CB refers to the currently allocated bandwidth for the segment in question (including over-allocated bandwidth). The value for CB can be derived using equation 3. Thus, equation 6 is satisfied if the combination of the previously allocated bandwidth, the new bandwidth required for connection K and the change in over-allocated bandwidth does not exceed the line rate (AR) for the ring segment.

Additionally, each ring segment between network element $NE_5$, the network element at which connection K terminates, and network element $NE_2$, the last network element used by a virtual connection of traffic shaper 104, must satisfy the requirements of equation 7.

$$AR \geq CB + NewOAB - OldOAB \quad (7)$$

Equation 7 differs from equation 6 in that the term $B_k$ is not included. This reflects the fact that virtual connection K terminated prior to these ring segments. It is noted that these ring segments are affected by the change in over-allocated bandwidth, if any.

In the example of FIG. 3, connection K is the furthest terminating virtual connection for traffic shaper 104. In this case, each ring segment that is effected by traffic shaper 104 must satisfy either equation 8 or equation 9 for connection K to be allowed. For example, each effected ring segment between network element $NE_4$, the network element associated with traffic shaper 104, and network element $NE_2$, previously the furthest network element serviced by traffic shaper 104, must satisfy the requirements of equation 8.

$$AR \geq CB + B_k + NewOAB - OldOAB \quad (8)$$

This equation is similar in scope to equation 6 above. The remaining ring segments that carry traffic from traffic shaper 104 must meet the requirements of equation 9.

$$AR \geq CB + B_k + NewOAB \quad (9)$$

Equation 9 does not include a term related to the old over-allocated bandwidth. This is because each of these segments is located after the network element that terminated the last traffic source of traffic shaper 104 prior to the addition of traffic source K. Thus, prior to connection K there was no over-allocated bandwidth for these segments.

In one embodiment, connection controller 102 includes a processor 106 that executes instructions to perform the functions described above with respect to determining when to allow a virtual connection to be established. As such, connection controller 102 includes a combination of hardware and software to interface with network element $NE_1$. For example, connection controller 102 can be implemented in hardware and software on a network management interface (NMIC) card that interfaces with the network elements of network 100 through a backplane of network controller $NE_1$. In one embodiment, connection controller 102 includes a memory 108 that stores executable code or instructions to implement the functions described above and a processor 106 that executes the instructions.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the embodiments are described in terms of unidirectional connections between endpoints. The endpoints are shown as either a traffic originating endpoint or a traffic terminating endpoint. It is understood that each endpoint typically will act both as a terminating and an originating endpoint. This is accomplished by setting up two unidirectional virtual connections between the two endpoints. One connection carries data around the network from a first endpoint to a second endpoint. The second connection carries data packets around the network from the second endpoint to the first endpoint. Thus, a bidirectional link can be established by the combination of two unidirectional virtual connections.

In certain implementations, a traffic shaper that controls multiple traffic sources may not be able to deliver the traffic for each traffic source according to the allocated bandwidth for the sources. However, the total delivered bandwidth for the traffic shaper is guaranteed. Thus, in some implementations, a weight can be used with the over-allocated bandwidth. The weight can be for a specific traffic shaper and can be different for various segments of the ring.

In some implementations, a traffic source will transmit signals over two complementary paths around the ring, e.g., signals are transmitted over different channels in opposite directions around the ring. In this circumstance, the connection controller makes separate determinations for each path around the ring to determine whether to allow a connection.

What is claimed is:

1. A method for controlling virtual connections between endpoints over a unidirectional ring network that includes a number of network elements coupled together to form segments of the ring network, the method comprising:

receiving a request to add a virtual connection between first and second endpoints on the ring network;

identifying a subset of the segments of the unidirectional ring network that would be affected by adding the virtual connection between the first and second endpoints;

retrieving data that represents a currently allocated capacity for each affected segment;

for each affected segment, determining whether adding the requested virtual connection would exceed a capacity for the segment; and transmitting at least one signal over the ring to add the virtual connection when adding the virtual connection does not exceed the capacity for any of the affected segments.

2. The method of claim 1, wherein retrieving data that represents the currently allocated capacity comprises retrieving data that represents an amount of bandwidth that is allocated to established connections.

3. The method of claim 2, wherein retrieving data that represents the currently allocated capacity further comprises retrieving data that represents over-allocated bandwidth.

4. The method of claim 1, wherein determining whether adding the requested virtual connection would exceed the capacity for the segment comprises:

for segments that would transport data packets for the requested virtual connection, determining whether the segment has sufficient capacity for a bandwidth used by the connection and additional over-allocated bandwidth for a traffic shaper that provides the requested virtual connection to the ring network;

for segments that would transport data packets from other virtual connections originating from the same traffic shaper but not the requested virtual connection, determining whether the segment has sufficient capacity for the additional over-allocated bandwidth; and for segments that would transport data packets from the requested virtual connection but no other virtual connection of the traffic shaper, determining whether the segment has sufficient capacity for the requested connection and the over-allocated bandwidth for the traffic shaper.

5. The method of claim 1, wherein identifying affected segments comprises identifying segments that carry at least one connection from a traffic shaper used by the requested virtual connection.

6. A method for controlling virtual connections between endpoints over a unidirectional ring network that includes a number of network elements coupled together to form segments of the ring network, the method comprising:

receiving a request to add a virtual connection between first and second endpoints on the unidirectional ring network;

identifying a subset of the segments of the unidirectional ring network that would be affected by adding the virtual connection between the first and second endpoints;

retrieving data that represents a currently allocated capacity for each affected segment;

for each affected segment, determining whether adding the requested virtual connection would exceed a capacity for the segment;

transmitting at least one signal over the ring to add the virtual connection when adding the virtual connection does not exceed the capacity for any of the affected segments; and statistically multiplexing a number of virtual connections together as a single traffic source.

7. The method of claim 6, and further comprising controlling a number of traffic sources with a traffic shaper that delivers data packets to the network with a selected data rate.

8. The method of claim 7, and further comprising determining an over-allocated bandwidth for a traffic shaper that is used to assure quality of service for the traffic shaper.

9. A method for allocating bandwidth for a virtual connection between endpoints over a number of network entities that form a ring, comprising:

receiving a request to create a virtual connection between first and second endpoints, wherein the first endpoint is associated with a traffic shaper that provides data packets to the ring network in discrete bandwidth units;

identifying segments of the ring network that would be affected by an addition of the requested virtual connection;

determining over-allocated bandwidth for the traffic shaper with the addition of the requested virtual connection;

for each affected segment, determining whether sufficient bandwidth is available to accommodate the requested virtual connection and the over-allocated bandwidth; and establishing the virtual circuit when it is determined that sufficient bandwidth is available on each affected segment.

10. The method of claim 9, the step of identifying the segments of the ring network that would be affected by the addition of the requested virtual connection comprises the step of identifying ring segments that carry data packets for at least one of the virtual connections from the traffic shaper.

11. The method of claim 9, the step of determining whether sufficient bandwidth is available to accommodate the requested virtual connection and the over-allocated bandwidth comprises:

for segments that would transport data packets for the requested virtual connection, determining whether the segment has sufficient capacity for the bandwidth used by the connection and additional over-allocated bandwidth for a traffic shaper that provides the requested virtual connection to the ring network;

for segments that would transport data packets from other virtual connections originating from the same traffic shaper but not the requested virtual connection, determining whether the segment has sufficient capacity for the additional over-allocated bandwidth; and for segments that would transport data packets from the requested virtual connection but no other virtual connection of the traffic shaper, determining whether the segment has sufficient capacity for the requested connection and the over-allocated bandwidth for the traffic shaper.

12. A method for allocating bandwidth for a virtual connection between endpoints over a number of network entities that form a ring, comprising:

receiving a request to create a virtual connection between first and second endpoints, wherein the first endpoint is associated with a traffic shaper that provides data packets to the ring network in discrete bandwidth units;

identifying segments of the ring network that would be affected by the addition of the connection between the first and second endpoints;

determining over-allocated bandwidth for the traffic shaper with the addition of the requested virtual connection;

for each affected segment, determining whether sufficient bandwidth is available to accommodate the requested virtual connection and the over-allocated bandwidth; and establishing the virtual circuit when it is determined that sufficient bandwidth is available on each affected segment;

wherein the step of establishing the virtual circuit includes allocating bandwidth for the virtual circuit and the over-allocated bandwidth on the affected segments.

13. A method for determining a bandwidth used by a traffic shaper that controls access to a ring network for a number of endpoints of virtual connections, the method comprising:

determining a bandwidth requirement for each virtual connection that is related to peak and sustained rates for delivery of data packets for the virtual connection;

summing the bandwidth requirement for each of the virtual connections;

determining an integer value that represents a number of units of bandwidth deliverable by the traffic shaper that are required to at least accommodate the bandwidth requirement;

multiplying the integer value by the bandwidth of a unit bandwidth to determine the delivering bandwidth of the traffic shaper; and storing the delivering bandwidth of the traffic shaper to be used in allocating bandwidth in a ring network.

14. The method of claim 13, wherein the step of determining an integer value that represents the number of units of bandwidth comprises:

dividing the bandwidth requirement by an incremental bandwidth amount for that traffic shaper; and rounding up the result of the dividing step to an integer value.

15. A communication network that transmits data over virtual connections between communication endpoints, the network comprising:

a number of network elements coupled together so as to form a unidirectional ring with adjacent network elements communicating over ring segments, each network element operable to communicate data between the network and at least one endpoint; and at least one network element including a connection controller that determines whether adding a requested virtual connection would exceed a bandwidth capacity for a subset of segments affected by an addition of the virtual connection, the affected segments including segments between an originating network element of the requested virtual connection and a terminating network element of the requested virtual connection, the affected segments further including segments subsequent to the terminating network element;

wherein the network elements include add/drop multiplexers.

16. The network of claim 15, wherein the connection controller includes a processor for executing instructions to determine, for each affected ring segment, whether adding the virtual connection would exceed the bandwidth capacity of a segment of the ring network.

17. A circuit that determines whether to allow a virtual connection to be established over a ring of network elements wherein adjacent network elements are coupled together by ring segments, the circuit comprising:

a memory that stores instructions; and a processor for executing the instructions to identify a subset of ring segments affected by the potential virtual connection and to determine, for each affected ring segment, whether adding the virtual connection would exceed a bandwidth capacity of a segment of the ring network;

wherein the processor further executes instructions to determine whether to add the virtual connection based on allocated and over-allocated bandwidth for existing virtual connections on the affected segments.

18. A circuit that determines whether to allow a virtual connection to be established over a ring of network elements wherein adjacent network elements are coupled together by ring segments, the circuit comprising:

a memory that stores instructions; and a processor for executing the instructions to determine, for each affected ring segment, whether adding the virtual connection would exceed a bandwidth capacity of a segment of the ring network;

wherein the processor further executes instructions to determine a change in an over-allocated bandwidth that would be caused in the ring network by adding the virtual connection, the change in over-allocated bandwidth being used in determining whether adding the virtual connection would exceed the bandwidth capacity of each affected ring segment; and wherein the processor further executes instructions to establish the virtual connection when it is determined that adding the virtual connection will not exceed the bandwidth capacity of any of the affected ring segments.

19. The circuit of claim 18, wherein the processor further executes instructions to determine the ring segments that would be affected by the addition of the virtual connection.

* * * * *

UNITED STATES PATENT AND TRADEMARK OFFICE
CERTIFICATE OF CORRECTION

| | | |
|---|---|---|
| PATENT NO. | : 6,757,247 B1 | Page 1 of 1 |
| APPLICATION NO. | : 09/026729 | |
| DATED | : June 29, 2004 | |
| INVENTOR(S) | : Zheng et al. | |

It is certified that error appears in the above-identified patent and that said Letters Patent is hereby corrected as shown below:

On the face of the issued patent, under the section entitled "References Cited," insert the following U.S. Patent Document: --5,390,194 A  2/1995  Kremer…………..370/27--

Signed and Sealed this

Fourth Day of November, 2008

JON W. DUDAS
*Director of the United States Patent and Trademark Office*